Oct. 7, 1958             D. C. YOUNGS             2,854,698
METHOD OF MAKING PRESSURE-SENSITIVE, UNSUPPORTED,
ORGANOSILICON RUBBER TAPE
Filed April 23, 1956
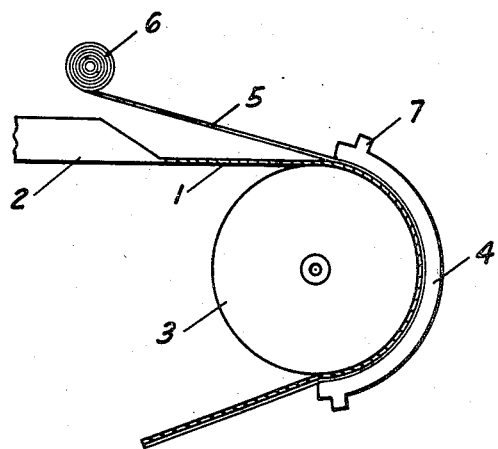
INVENTOR.
DELMAR C. YOUNGS
BY Robert F Fleming Jr.
ATTORNEY

United States Patent Office 2,854,698
Patented Oct. 7, 1958

2,854,698

METHOD OF MAKING PRESSURE-SENSITIVE, UNSUPPORTED, ORGANOSILICON RUBBER TAPE

Delmar C. Youngs, Midland, Mich., assignor to Dow Corning Corporation, Midland, Mich., a corporation of Michigan Application April 23, 1956, Serial No. 580,016

5 Claims. (Cl. 18—48)

This invention relates to a method of making "unsupported" silicone rubber tape, that is tape which contains no reinforcing sheets, fabrics or fibers.

Pressure-sensitive organosilicon rubber tapes have been known for some time. The ones which have proved to be commercially satisfactory have been the so-called "supported tapes" which were reinforced by means of inorganic fabrics particularly glass fabric. In general the method of preparing such tapes is to heat one side of the tape by any convenient method while the other side is exposed to air. This causes a vulcanization of the tape on one side which renders that side non-tacky while the other side is not vulcanized and remains sticky. The coherence of such a tape depends upon the fabric or other reinforcing sheet or fibrous material which is embedded therein. When these tapes are wrapped around a base member such as an electric coil with the sticky side inward and are thereafter heated, the various layers fuse into a unitary whole.

These pressure-sensitive supported tapes have met with considerable commercial success but they suffer from several disadvantages. For one thing, the fabric embedded in the tapes render them essentially non-elastic and hence difficult to stretch around sharp angles to form smooth wrappings. This increases the fabrication problems involved in using these tapes.

A second difficulty is that the presence of the glass fabric lowers the dielectric constant of the finished tape below that of straight silicone rubber. Furthermore the presence of the glass introduces the danger of brakes in the insulation due to improper impregnation of the fabric during preparation of the tape.

Prior to this invention commercially successful, unsupported, silicone rubber tapes were made by extruding a ribbon or sheet of silicone rubber and thereafter vulcanizing the product throughout. The resulting tapes were elastic and lent themselves readily to fabrication of insulated coils, but they were not pressure-sensitive. Consequently in order to employ them in the wrapping of base members it was necessary to first apply an adhesive silicone rubber paste to the base member prior to application of the tape. The wrapped article was then heated in order to covulcanize the paste and the tape. This method necessitates a two-step procedure and the handling of two different materials. Thus, it is more costly to fabricate articles using these non-adhesive tapes than it would be using the pressure-sensitive tapes. Consequently there was a demand for an unsupported, silicone rubber tape which was at the same time pressure-sensitive.

Previous methods for preparing pressure-sensitive, silicone rubber tapes failed to produce satisfactory unsupported, pressure-sensitive tapes. Either the tape was not vulcanized sufficiently to cohere without a fabric or the tape was vulcanized too far so that it was no longer pressure-sensitive. This failure was particularly noticeable with tapes in the thickness range of 10 to 50 mils. Such relatively thin tapes are in great demand for electrical insulation. Prior to this invention there was no satisfactory way of producing such tapes. Consequently this invention represents a substantial advancement in the art of silicone rubber insulation.

It is the primary object of this invention to prepare a commercially useful, unsupported, pressure-sensitive, silicone rubber tape. Another object is to provide a more economical means for insulating electrical coils with silicone rubber than has heretofore been possible. Other objects and advantages will be apparent from the following description.

This invention relates to a method of preparing pressure-sensitive, unsupported, silicone rubber tapes which comprises heating a sheet of raw silicone rubber on one side at a temperature of from 350 to 425° F. for from 5 to 30 seconds while the opposite side of the sheet is cooled at a temperature below 100° F.

The process of this invention consists essentially of controlled heating and controlled cooling of opposite sides of a sheet of silicone rubber while it is being partially vulcanized. The applicant has found that within conditions above defined one can prepare commercially satisfactory, pressure-sensitive, unsupported, silicone rubber tapes particularly in the 10 to 50 mil thickness class. Satisfactory tapes are not obtained when the above conditions are not adhered to.

The method of this invention may be carried out employing any suitable apparatus or by any suitable means. It lends itself both to continuous and discontinuous operation. For example, the sheet of raw silicone rubber may be placed on a hot surface and cold air or other gases blown across the opposite surface. Alternately the silicone rubber sheet may be placed on a cold surface and hot gases blown across the opposite face of the sheet.

The preferred method of carrying out this invention can be accomplished by employing the apparatus shown in the accompanying drawing. This apparatus lends itself particularly well to continuous preparation of the pressure-sensitive, unsupported, silicone rubber tapes of this invention. The drawing is a diagrammatic sketch of a suitable apparatus in which a sheet of raw silicone rubber 1 is extruded from a suitable extrusion head 2 while simultaneously a slip sheet of interleaving material 5 (such as polyethylene) is pulled from roll 6. The two sheets, 1 and 5, come together at the surface of heated revolving drum 3 and pass around this drum with one face of the silicone rubber sheet in contact with the drum while the slip sheet is in contact with cooled shoe 4. The shoe is provided with inlet and outlet tubes 7 through which a cooling fluid can be circulated. The partially vulcanized silicone rubber together with the interleaving material is then rolled on a suitable roll. It can then be cut into the desired width for tape. During the passage of the silicone rubber sheet around the drum the temperature of the heated drum and that of the cooling shoe can be so adjusted that the proper degree of vulcanization will be obtained.

Preferably the raw silicone rubber employed in this invention contains a peroxide vulcanizing agent. Suitable peroxides include any organic peroxide such as benzoyl peroxide, t-butylperbenzoate, dicumyl peroxide, t-butylperacetate, isopropylbenzenehydroperoxide, acetyl peroxide and any of the peroxides shown in U. S. Patent 2,460,795.

The precise temperature and time employed with each type of rubber varies (within the above limits) depending upon the type of peroxide employed and the precise formulation of the raw rubber. Thus, one combination of peroxide and siloxane polymer may vulcanize successfully in 15 seconds at 350° F. while another combination may require only 10 seconds at 350° F. or may require say 15 seconds at 325° F. The optimum conditions for each rubber can be readily determined.

The temperature of the cooled side of the sheet should be less than 100° F. The precise temperature may be varied below this limit depending upon the thickness of the sheet being partially vulcanized. For example, if a sheet of 10 mils thickness is being vulcanized it will be necessary to have the cooled side at a lower temperature for any given vulcanization temperature on the hot side than if the sheet being vulcanized were say 50 to 100 mils thick. Obviously the thinner the sheets, the more rapidly the heat will penetrate through it. Thus in order to prevent vulcanization of the cooled side it is ordinarily held at a lower temperature. In general the cooled side is preferably held at a temperature from 30 to 50° F. although higher or lower temperatures may be satisfactorily employed.

The process of this invention lends itself to silicone rubber containing any type of organopolysiloxane and any type of filler. The compositions of organosilicon rubbers are well-known, commercial products and there is no need for any further description here.

Alternatively the process of this invention can be carried out by a discontinuous process. For example, instead of the heated drum 3, one can employ a heated plate and instead of a cooling shoe 4, one can employ a cooled table through which water circulates.

The following examples are illustrative only. The invention is properly delineated in the appended claims.

*Example 1*

A sheet of raw silicone rubber comprising 100 parts by weight of a dimethylpolysiloxane gum, 35 parts by weight of a fume silica and about 1.2 parts by weight of 2,4-dichlorobenzoyl peroxide was calendered on a sheet of polyethylene to give a layer of silicone rubber 20 mils thick. The polyethylene coated side of the sheet was then placed on a metal plate which was cooled by circulating water. The plate was maintained at temperatures of 50 to 55° F. A heated plate was pressed against the silicone rubber surface so that the sheet was heated 10 seconds at 360° F. The heated plate was removed and the partially vulcanized silicone rubber was stripped from the polyethylene sheet. The tape was completely vulcanized on the side against the hot plate but was not vulcanized on the side against the cooled polyethylene sheet. As a result, the sheet was coherent, tough and pressure-sensitive. It was cut into widths suitable for electrical tape and was found to be eminently satisfactory for wrapping electric coils.

*Example 2*

Equivalent results are obtained when the composition of Example 1 is continuously extruded into a sheet 20 mils thick and then partially vulcanized by heating on a revolving drum 10 seconds at 360° F. as shown in the drawing while the side of the silicone rubber against the polyethylene slip sheet is being cooled by water circulating through the shoe. The shoe is maintained at a temperature of 50° F. throughout the operation.

*Example 3*

Equivalent results are obtained when the following siloxanes are employed in the method of Example 1:

(1) 90 mol percent dimethylsiloxane and 10 mol percent phenylmethylsiloxane
(2) trifluoropropylmethylsiloxane
(3) 89 mol percent dimethylsiloxane, 1 mol percent methylvinylsiloxane and 10 mol percent diphenylsiloxane.

That which is claimed is:

1. The method of preparing a pressure-sensitive, unsupported, silicone rubber tape which comprises heating a sheet of raw, unvulcanized silicone rubber on one side at a temperature of from 350 to 425° F. for from 5 to 30 seconds while simultaneously cooling the opposite side of the silicone rubber sheet at a temperature below 100° F.

2. The method of in accordance with claim 1 wherein the sheet of silicone rubber is from 10 to 50 mils thick.

3. The method of preparing a pressure-sensitive, unsupported, silicone rubber tape which comprises simultaneously passing a sheet of raw, unvulcanized silicone rubber and a sheet of polyethylene around a heated drum which is maintained at a temperature sufficient so that the side of the silicone rubber sheet adjacent the drum is heated at a temperature of from 350 to 425° F. for from 5 to 30 seconds while the opposite side of the silicone rubber sheet against the polyethylene is cooled by means of a shoe to a temperature below 100° F.

4. The method in accordance with claim 3 wherein the silicone rubber sheet has a thickness of from 10 to 50 mils.

5. The method of preparing a pressure-sensitive, unsupported, silicone rubber tape which comprises simultaneously passing a sheet of raw, unvulcanized silicone rubber and a slip sheet of interleaving material around a heated drum which is maintained at a temperature sufficient so that the side of the silicone rubber sheet adjacent the drum is heated at a temperature of from 350 to 425° F. for from 5 to 30 seconds while the opposite side of the silicone rubber sheet against the slip sheet of interleaving material is cooled by means of a shoe to a temperature below 100° F.

References Cited in the file of this patent

UNITED STATES PATENTS

| | | |
|---|---|---|
| 2,460,795 | Warrick | Feb. 1, 1949 |
| 2,648,097 | Kritchever | Aug. 11, 1953 |
| 2,708,289 | Collings | May 17, 1955 |
| 2,746,084 | Kreidl | May 22, 1956 |